Patented Sept. 20, 1932

1,877,795

UNITED STATES PATENT OFFICE

MAX BOCKMÜHL, GUSTAV EHRHART, AND LEONHARD STEIN, OF FRANKFORT-ON-THE-MAIN, GERMANY, ASSIGNORS TO WINTHROP CHEMICAL COMPANY, INC., OF NEW YORK, N. Y., A CORPORATION OF NEW YORK

1-PHENYL-2-AMINOALCOHOLS (1) HYDROXYLATED IN THE PHENYL NUCLEUS AND PROCESS OF PREPARING THEM

No Drawing. Application filed November 12, 1930, Serial No. 495,284, and in Germany November 26, 1929.

The present invention relates to 1-phenyl-2-aminoalcohols (1) hydroxylated in the phenyl nucleus and to a process of preparing them.

Since the introduction of adrenaline into medicine attempts have been made to synthesize other alkamines of the same kind, and the work has been stimulated by the introduction of ephedrine. But only those synthetical methods have proved to be suitable in practice in which one starts from the correspondingly halogenated ketones (for instance chlorinated pyracetic catechine, bromo-propriophenone), causing them to react with an amine and then reducing the ketogroup to the alcohol. Other processes, such as the reduction of the cyanhydrines or the nitrocompounds, which are prepared, for instance, according to Rosenmund "Berichte der deutschen chemischen Gesellschaft", volume 46, page 1034 from nitromethan and aldehyde with sodium, have not found any interest in technics.

We have now found that, by causing nitrous acid to act upon aromatic-aliphatic ketones hydroxylated in the phenyl nucleus, the corresponding isonitroso compounds and, by reducing them, the corresponding alkamines can easily be prepared. The nitrous acid may be produced in the reaction mixture by causing an acid to act upon an ester of nitrous acid. It could not be foreseen that we would succeed in introducing the nitroso group because nitroso-phenols are formed by causing nitrous acid esters to act upon phenols (cf. for instance, "Berichte der deutschen chemischen Gesellschaft", volume 17, page 400). It is surprising that by causing nitrous acid and the esters thereof to act upon the above-mentioned ketones, isonitroso-ketones are formed and that the nitroso group is not introduced into the benzene nucleus.

Since the isonitroso-ketones can easily be reduced to the corresponding alkamines, the new process represents a simple and technically valuable means for producing alkamines hydroxylated in the phenyl nucleus.

The following examples serve to illustrate the invention, but they are not intended to limit it thereto:

(1.) 17.2 grams of butyl nitrite are introduced drop by drop, while stirring and introducing hydrochloric acid gas and boiling in a reflux apparatus, into a solution of 25 grams of para-hydroxy-propiophenone, 160 cc. of ether and 120 cc. of benzene. When all of the butyl nitrite has been introduced, hydrochloric acid is introduced for ½ hour, and the whole is then stirred for about 5-6 hours at room temperature. The solution is then clear and has a red colour. Ether and benzene are then distilled off, the residue is dissolved in a sodium carbonate solution of 10 per cent strength and the hydroxy-isonitroso-propiophenone is precipitated, while cooling, by means of hydrochloric acid. 25 grams of hydroxy-isonitroso-propiophenone are obtained melting at 177–178° C.

14 grams of hydroxy-isonitroso-propiophenone are mixed with 38 grams of tin dichloride dissolved in 75 cc. of concentrated hydrochloric acid. The temperature rises rapidly but it must not exceed 60° C. The tin double salt precipitates. The whole is allowed to stand for about 6 hours, then filtered by suction, dissolved in water and the solution, freed from tin is evaporated to dryness. 10 grams of parahydroxyaminopropiophenone-hydrochloride are obtained.

50 grams of para-hydroxy-aminopropiophenone-hydrochloride are dissolved in 200 cc. of water and reduced at 80° C. and under a hydrogen pressure of between 30 and 40 atmospheres in the presence of a 10% nickel catalyst. The catalyst is filtered by suction, the aqueous solution is evaporated to dryness and the hydrochloride of the 1-(para-hydroxyphenyl)-2-aminopropanol-1 of the following formula

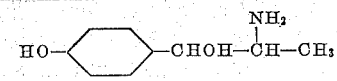

is re-dissolved from a mixture of alcohol and ether. It melts at 207° C. The yield is nearly quantitative.

(2.) 12 grams of para-hydroxy-isonitrosopropiophenone are dissolved in 150 cc. of alcohol containing 8 grams of hydrochloric acid and the whole is shaken with palladium and hydrogen. When no more hydrogen is absorbed, the catalyst is filtered by suction, the filtrate is concentrated in a vacuum and the hydrochloride of the 1-(para-hydroxyphenyl)-2-amino-propanol-1 remains. The yield is quantitative.

(3.) 19 grams of meta-hydroxypropiophenone are dissolved in 45 cc. of ether and 165 cc. of benzene and 13 grams of butyl nitrite are run in drop by drop while introducing hydrochloric acid. After the mixture of ether, benzene and butyl alcohol has been distilled off, the residue solidifies to a crystalline mass; it is dissolved in sodium carbonate solution and meta-hydroxy-isonitroso-propiophenone is precipitated with hydrochloric acid. It melts at 130° C. The yield is nearly quantitative.

12 grams of meta-hydroxy-isonitrosopropiophenone are hydrogenated by means of palladium and hydrogen as indicated in Example 2. The hydrochloride of the 1-(meta-hydroxyphenol)-2-amino-propanol-1 of the following formula

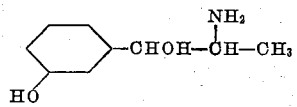

is obtained melting at 180° C.

The meta-hydroxypropiophenone used as starting material can be prepared in the following manner:

50 grams of propiophenone are introduced drop by drop at 0°C.–5°C. into a mixture of acetic anhydride and nitric acid. After ½ hour, the whole is poured on ice and the meta-nitropropiophenone is filtered by suction. When re-dissolved from alcohol, it melts at 96° C.–97° C. The yield amounts to 35 grams.

100 grams of meta-nitropropiophenone are hydrogenated at 50° C.–60° C. in an alcoholic solution in the presence of a nickel catalyst. After evaporation of the alcohol, the meta-aminopropiophenone distils at 138° C.–140° C. under 2 mm. pressure. The yield is quantitative.

30 grams of meta-aminopropiophenone are introduced into 35 grams of concentrated sulfuric acid in 300 cc. of water. The equimolecular quantity of a sodium nitrite solution is introduced drop by drop and the diazo solution is run drop by drop at 60° C. into a warm mixture of 15 grams of concentrated sulfuric acid and 150 cc. of water, which is covered by a layer of 200 cc. of toluene. The whole is stirred until the evolution of nitrogen is complete, the toluene solution is separated and, after distillation of the toluene, 23 grams of meta-hydroxypropiophenone are obtained. It melts at 69° C.

(4.) 18.5 grams of 3.4-dihydroxypropiophenone are suspended in 400 cc. of ether and 11.4 grams of butyl nitrite are slowly run in drop by drop while introducing hydrochloric acid gas. After an action of several hours, the liquid is evaporated to dryness and the crystalline mass obtained is stirred with a mixture of ether and petroleum ether and filtered by suction. By recrystallizing from water, fine needles are obtained decomposing at 212° C.

The 3.4-dihydroxyisonitrosopropiophenone is dissolved in alcoholic hydrochloric acid and hydrogenated with palladium and hydrogen. After the reduction is complete and the catalyst has been filtered by suction, the alcoholic liquid is evaporated in a vacuum and recrystallized from a mixture of methanol and acetone. The 1-(3'-4'-dihydroxyphenyl)-2-amino-propanol-1-hydrochloride melts at 178° C. The corresponding free base has the following formula

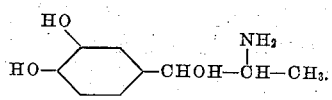

We claim:

1. The process which consists in causing nitrous acid to act upon a compound of the following formula

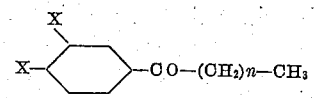

wherein at least one X stands for hydroxy, the other for hydrogen, n being 1 or a multiple thereof, and reducing the isonitroso compound thus obtained.

2. The process which consists in causing nitrous acid to act upon a compound of the following formula

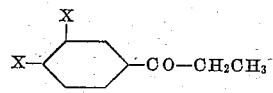

wherein at least one X stands for hydroxy, the other for hydrogen and reducing the isonitroso compound thus obtained.

3. The process which consists in causing nitrous acid to act upon a compound of the following formula

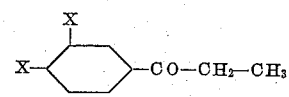

wherein at least one X stands for hydroxy, the other for hydrogen and reducing the isonitroso compound thus obtained, by means of hydrogen in presence of a hydrogenation catalyst.

4. The process which consists in causing butyl nitrite and a strong mineral acid to act upon para-hydroxypropiophenone and reducing the para-hydroxy-isonitrosopropiophenone thus obtained by means of hydrogen in presence of a hydrogenation catalyst.

5. The process which consists in causing butyl nitrite and hydrochloric acid to act upon para-hydroxy-propiophenone dissolved in ether and benzene and reducing the para-hydroxy-isonitrosopropiophenone thus obtained by means of hydrogen in presence of palladium.

6. The process which consists in causing butyl nitrite and a strong mineral acid to act upon meta-hydroxypropiophenone and reducing the meta-hydroxy-isonitroso-propiophenone thus obtained by means of hydrogen in presence of a hydrogenation catalyst.

7. The process which consists in causing butyl nitrite and hydrochloric acid to act upon meta-hydroxy-propiophenone dissolved in ether and benzene and reducing the meta-hydroxy-isonitrosopropiophenone thus obtained by means of hydrogen in presence of palladium.

8. The process which consists in causing butyl nitrite and a strong mineral acid to act upon 3.4-dihydroxy-propiophenone and reducing the 3.4-dihydroxy-isonitrosopropiophenone thus obtained by means of hydrogen in presence of a hydrogenation catalyst.

9. The process which consists in causing butyl nitrite and hydrochloric acid to act upon 3.4-dihydroxy-propiophenone dissolved in ether and benzene and reducing the 3.4-dihydroxy-isonitrosopropiophenone thus obtained by means of hydrogen in presence of palladium.

10. As new products, the compounds of the following formula

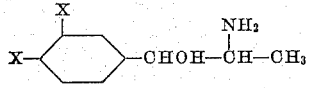

wherein one X stands for hydroxy, the other for hydrogen.

11. As a new product, the compound of the following formula

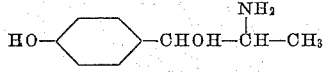

the hydrochloride of which melts at 207° C.

12. As a new product, the compound of the following formula

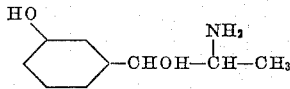

the hydrochloride of which melts at 180° C.

In testimony whereof, we affix our signatures.

MAX BOCKMÜHL.
GUSTAV EHRHART.
LEONHARD STEIN.

DISCLAIMER 1,877,795.—*Max Bockmühl, Gustav Ehrhart,* and *Leonhard Stein,* Frankfort-on-the-Main, Germany. 1-PHENYL-2-AMINOALCOHOLS (1) HYDROXYLATED IN THE PHENYL NUCLEUS AND PROCESS OF PREPARING THEM. Patent dated September 20, 1932. Disclaimer filed September 13, 1934, by the assignee, *Winthrop Chemical Company, Inc.*

Enters this disclaimer to certain of the claims of the above identified patent, namely, claims 1, 2, 3, 4, 6, 10, 11, and 12.

[*Official Gazette October 16, 1934.*]